United States Patent [19]
Nakamura et al.

[11] Patent Number: 5,220,611
[45] Date of Patent: Jun. 15, 1993

[54] SYSTEM FOR EDITING DOCUMENT CONTAINING AUDIO INFORMATION

[75] Inventors: Kenji Nakamura; Shigeru Matsuoka, both of Hitachi, Japan

[73] Assignee: Hitachi, Ltd., Tokyo, Japan

[21] Appl. No.: 422,577

[22] Filed: Oct. 17, 1989

[30] Foreign Application Priority Data

Oct. 19, 1988 [JP] Japan .................. 63-261521

[51] Int. Cl.⁵ ............................................. G10L 7/00
[52] U.S. Cl. ................................................. 381/48
[58] Field of Search ................................. 381/41–50, 381/56; 364/513.5

[56] References Cited

U.S. PATENT DOCUMENTS

| | | | |
|---|---|---|---|
| 3,881,059 | 4/1975 | Stewart | 381/48 |
| 4,335,276 | 6/1982 | Bull et al. | 381/48 |
| 4,375,083 | 2/1983 | Maxemchuk | 364/900 |
| 4,424,575 | 1/1984 | Clarke et al. | 364/900 |
| 4,627,001 | 12/1986 | Stapleford et al. | 381/48 |
| 4,764,965 | 8/1988 | Yoshimura et al. | 381/43 |
| 4,779,209 | 10/1988 | Stapleford et al. | 364/513.5 |
| 4,839,857 | 6/1989 | Mersiovsky et al. | 381/56 |
| 4,933,880 | 6/1990 | Borgendale et al. | 364/900 |

OTHER PUBLICATIONS

J. Gosch, "Voice-Synthesizer Editor Displays Speech as Curves Easily Alterable by Keyboard", Aug. 25, 1982, Electronics, vol. 55, No. 17, pp. 68, 70.

R. T. Nicholson, "Integrating Voice in the Office World", Dec. 1983, Byte, pp. 1–5.

Primary Examiner—Emanuel S. Kemeny
Assistant Examiner—Michelle Doerrler
Attorney, Agent, or Firm—Antonelli, Terry, Stout & Kraus

[57] ABSTRACT

A document edition system includes a microphone to input audio information; an analog to digital converter to convert the audio information into digital information; a memory unit to store the digital audio information into an external storage unit as information to be added to document information; a sound pressure display control unit to display the sound pressure information of the digital audio information to a display device; a digital to analog converter to regenerate the digital audio information from the memory unit into speech; and a device to add the audio information to an arbitrary position of the document information. The sound pressure display control unit can display the speech regenerating position from the digital to analog converter onto a sound pressure display waveform and also includes a device for displaying the sound pressure information by a predetermined pattern width or a tone. There is also provided a device for adding information denomination to the audio information and for storing the resultant audio information into the external storage unit; a device for reading out the audio information from the external storage unit by the information denominations added thereto upon reproduction; and a device for coupling and editing the plurality of readout audio information by their information denominations.

10 Claims, 16 Drawing Sheets

F I G. 3
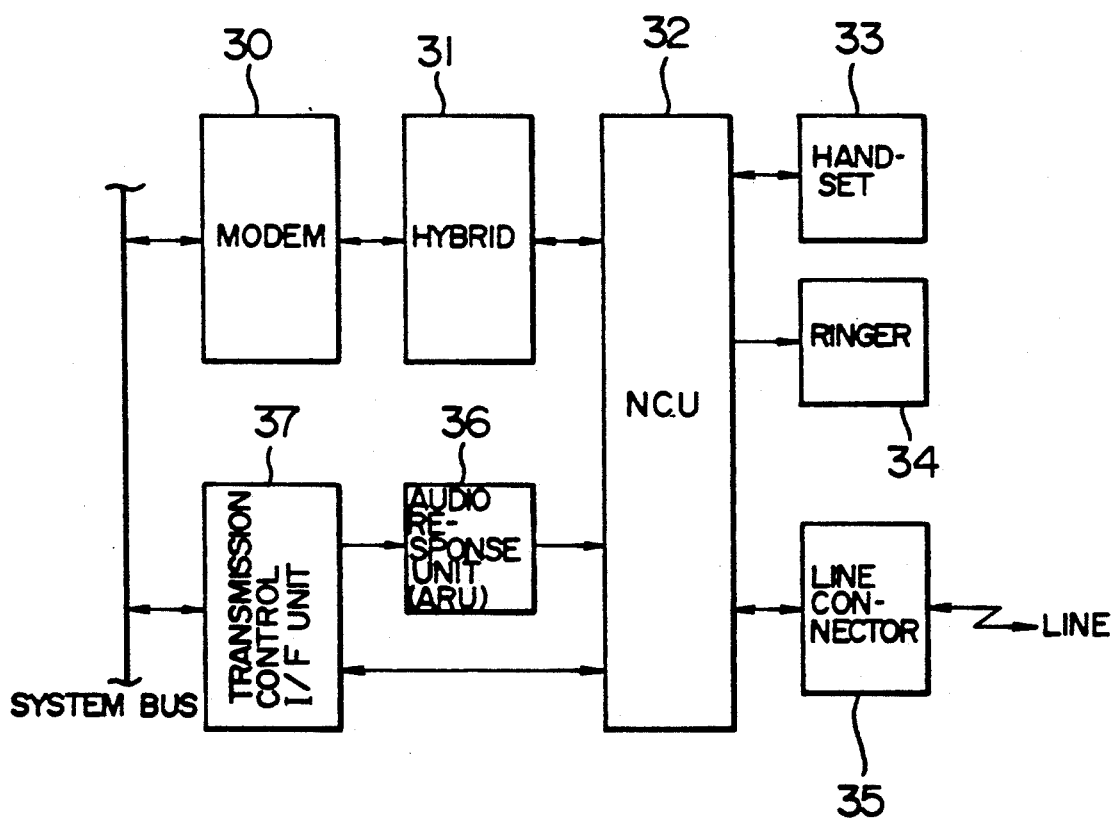

SYSTEM FOR EDITING DOCUMENT CONTAINING AUDIO INFORMATION

CROSS-REFERENCE TO THE RELATED APPLICATION

This application relates to a U.S. application Ser. No. 398,521 entitled "DOCUMENT EDITION SYSTEM", filed Aug. 25, 1989 by Kenji NAKAMURA and Shigeru MATSUOKA, based on Japanese Patent Application No. 63-212472, assigned to the present assignee. The disclosure thereof is incorporated herein by reference.

BACKGROUND OF THE INVENTION

1. Field of the Invention

The present invention generally relates to a document editing apparatus or system having functions such as inputting of text and other data, creating, editing or updating of documents, printing thereof and the like functions carried out, for example, by a word processor.

2. Description of the Related Art

With increased use of word processors in recent years, a variety of document processing functions have been developed to allow various types of information or data, such as graphics, patterns, illustrations and the like, to be handled in addition to character and text data for the creating and editing of documents. Besides, there exists a growing trend to utilize the document information generated by a word processor not only in the form of printed matter, i.e. document information printed on sheets of paper, but also to make such data available to other word processor(s) installed at remote location(s) by transmitting the document information in the form of code data so that the document information as transmitted can be processed and/or regenerated by the remote word processor.

On the other hand, there has been developed a document editing system which is capable of pronouncing input text information in a semi-natural voice by making use of audio information stored in a memory unit with a view to verifying that the input text information (i.e. information of character strings) has been correctly inputted. For particulars of this kind of word processor, reference may be made to JP-A-58-16330 and JP-A-58-125100. On the other hand, an audio input apparatus for converting audio information into text information is also provided in many of the word processors which are now on the market as a means for facilitating the information input process. As one of such a kind of processing apparatus, "ONSEI SHOIN" (made by Sharp Corporation) which has been exhibited in the Business Show which was held on May, 1988, can be mentioned. However, whether audio information is to be synthesized on the basis of text information or audio information is to be converted into text information, the information processed or handled internally of the document editing system is only the text information and the audio information which corresponds to the text information.

SUMMARY OF THE INVENTION

It is an object of the invention to provide a document editing system in which by adding peculiar information, such as speech information or audio information to a system, such as a document editing system which handles information called text, in which the person who wrote the text cannot be generally discriminated, it is possible to add information, such a document whose writer is limited, or music to the text thereby enabling a document having a production affect to be made.

Another object of the invention is to provide a document editing system in which, by enabling audio information to be handled in the same manner as text information, and by editing the audio information by a simple method, audio information having a large information amount is effectively formed and the information which has previously been registered by voice sound on a phrase unit basis is coupled and exchanged, so that effective audio information can be formed.

In view of the above objects, there is provided according to a general aspect of the present invention a document editing system which comprises input means for inputting character data, display means for displaying inputted data and results of editing, memory means for storing the character data inputted through the input means and system programs, external storage means for storing inputted data and the results of editing, and control means for executing editing of documents in accordance with the programs stored in the memory means, which system is characterized by means for inputting audio information, means for converting the audio information to corresponding numerically coded audio information, means for storing the numerically coded audio information in the external storage means as additional information for the document to be edited, means for regenerating the audio information from the numerically coded audio information and means for adding the audio information to the document information at a given position thereof.

The audio information is converted into numerical information to be added to the document information at given locations or places thereof to be stored and regenerated by audio regenerating means.

BRIEF DESCRIPTION OF THE DRAWINGS

FIG. 3 is a block diagram of a transmission control unit;

DESCRIPTION OF THE PREFERRED EMBODIMENTS

Now, the present invention will be described in detail in conjunction with exemplary or preferred embodiments thereof by reference to the accompanying drawings.

Figure 18:
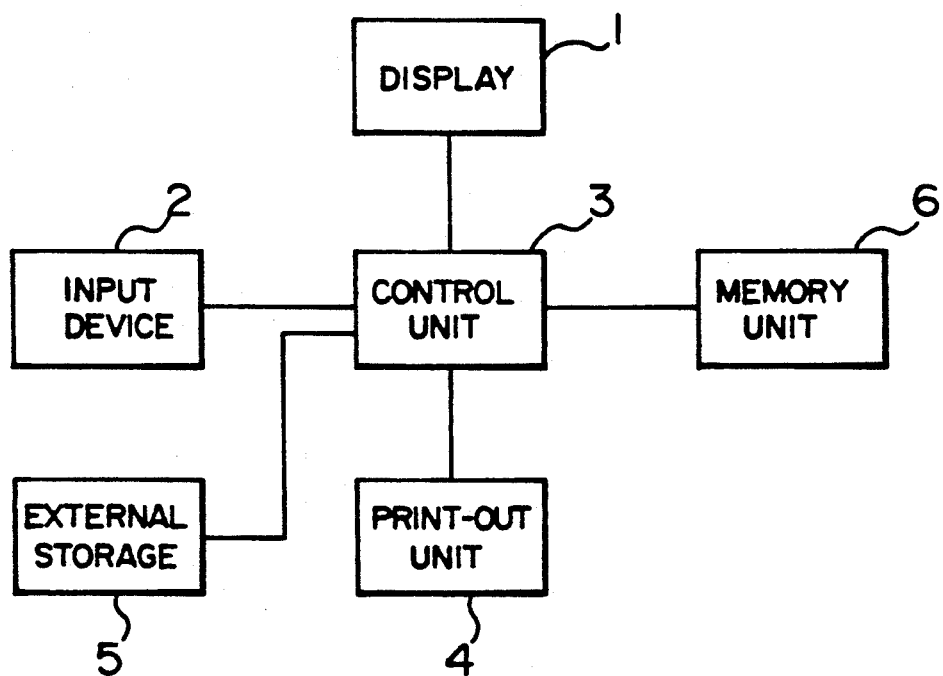
FIG. 18 is a block diagram showing an example of a general document editing system.

In the first place, description will be made of the basic functions of a document editing system in general by referring to a functional block diagram shown in FIG. 18. This document editing system is composed of a control unit 3 implemented around a CPU (Central Processing Unit) as an essential component, a memory unit 6 including a RAM (Random Access Memory) and a ROM (Read Only Memory) and employed as a primary memory for storing programs which determine the flow of processings to be executed by the control unit 3 as well as information involved in the processing, an external storage unit 5 constituted generally by a magnetic recorder such as a FDD (Floppy Disc Drive) or the like and employed for storing the programs mentioned above and for saving document information or data as generated, a display device 1 constituted by a CRT (Cathode Ray Tube) or the like for displaying the contents of processing and the status thereof, an input device 2 constituted by a keyboard or the like and serving as data (information) input means and a printer 4 serving as the output means for the character, text and/or other information. Of course, there is required indispensably a power supply for supplying electric energy to effectuate physical operation of the system. However, description of the power supply unit is omitted because it is irrelevant to the essence of the present invention.

Upon activation of the document editing system, the programs stored in the ROM of the memory unit 6 are sequentially read into the CPU through the control unit 3, whereupon the programs required for the system to perform document editing are read out from the FDD of the external storage unit 5 in accordance with the programs read out from the ROM to be stored in a program storing area of the RAM constituting a part of the memory unit 6. Upon completion of the processing mentioned above, operation of the system as document editing system is validated. More specifically, the requisite programs are executed in accordance with the command information designated sequentially with the aid of the input device 2, while the document information and other information as inputted and required for the editing currently performed are stored in the RAM of the memory unit 6. When the document for which editing has been completed is to be saved, then processing for registration and/or storage of the document in the external storage equipment is executed. Parenthetically, it should be mentioned that the document information includes character information as well as character attribute information, such as information concerning underlined characters, cross-hatched characters and others and graphic information generated through the graphic generating function of the system. It goes without saying that other information than the character information can be stored in the RAM of the memory unit 6 and the external storage equipment 5. Operation of the document processing system is performed in the manner outlined above.

Now referring to FIGS. 1 to 17, description will be made of an exemplary embodiment of a document editing system which is capable of realizing addition of audio information to the document information according to the present invention.

Figure 1:
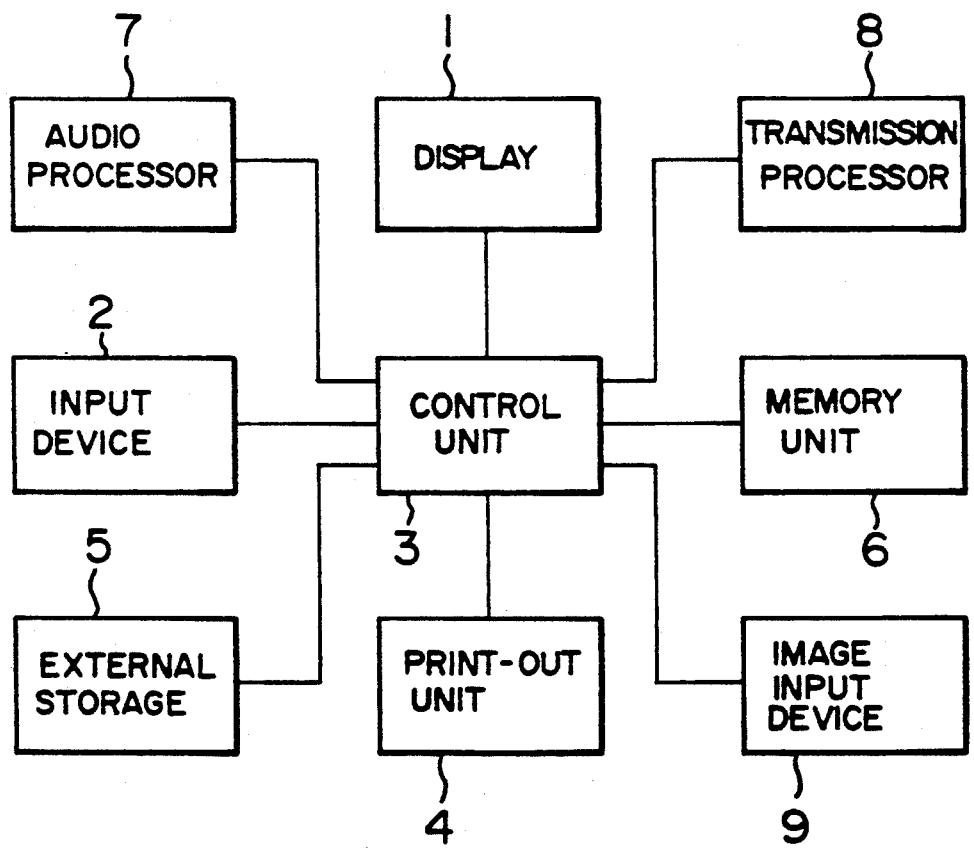
FIG. 1 is a block diagram of a whole document editing system according to the present invention.
Figure 2:
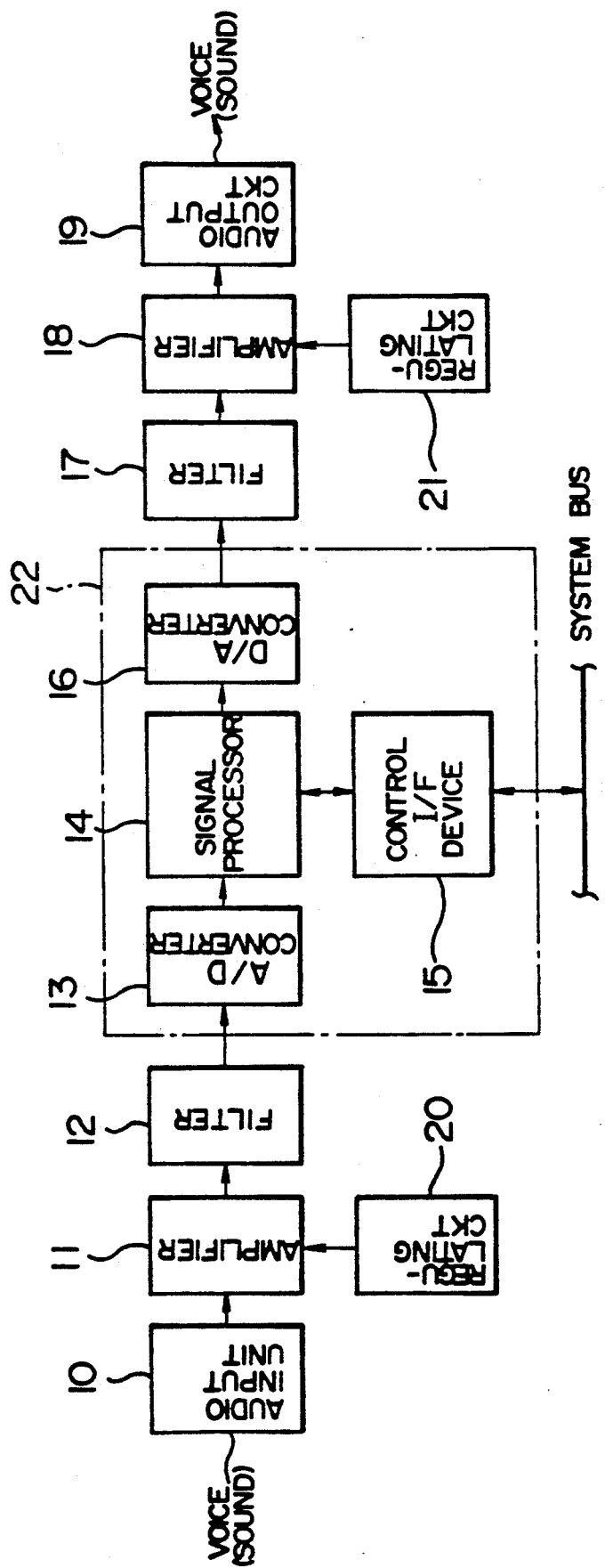
FIG. 2 is a block diagram of a speech processor.
Figure 4:
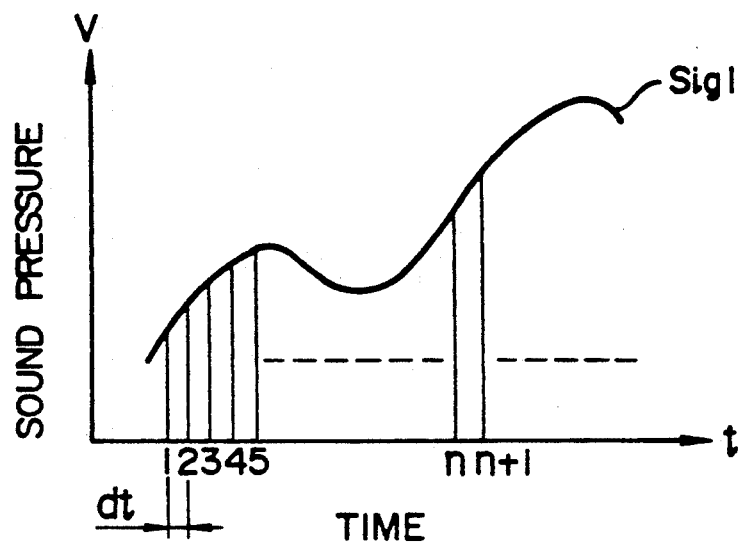
FIGS. 4 to 6 are explanatory diagrams of a data processing method of a speech signal.
Figure 5:
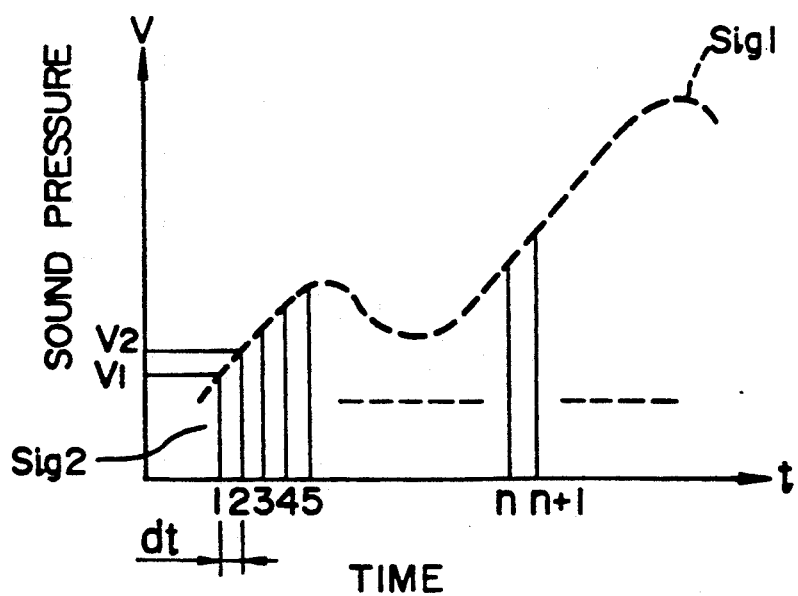
Figure 6:
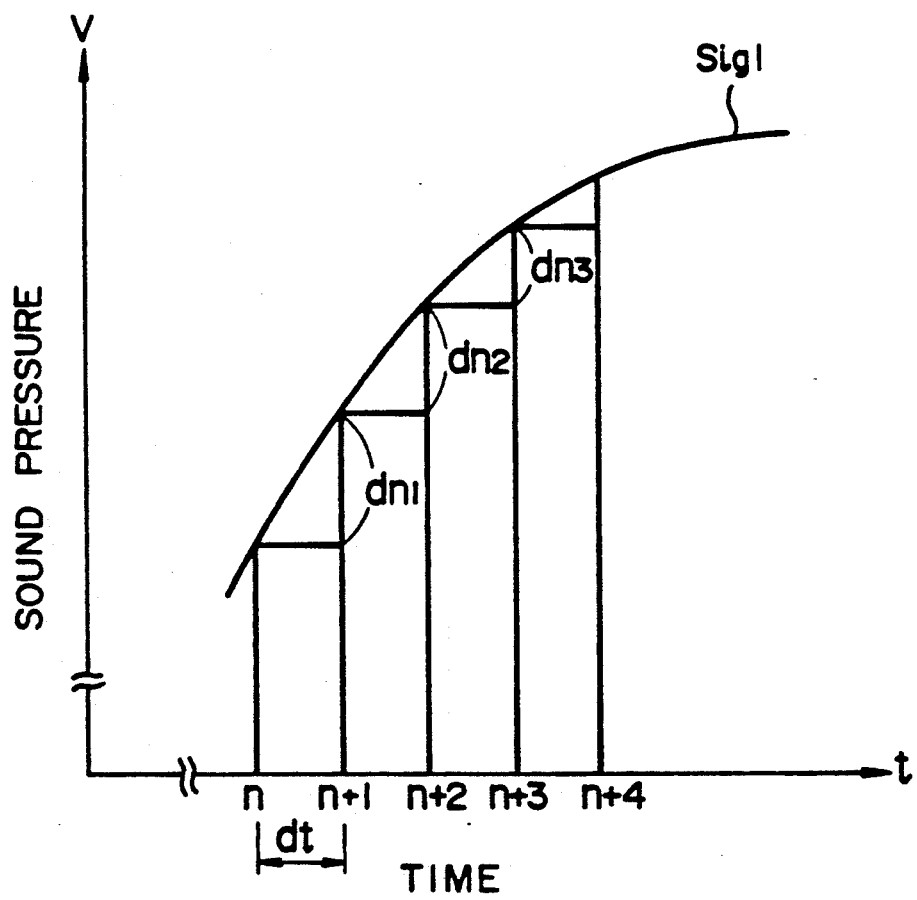

At first, description will be directed to a general arrangement of the whole system by reference to block diagrams shown in FIGS. 1 to 3. In these figures, the display unit 1, the input device 2, the control unit 3, the printer output unit 4, the external storage equipment 5 and the memory unit 6 may be regarded as the same as those described with reference to FIG. 18.

As can be seen in FIG. 1, provided additionally is an audio information processor 7 which serves to convert analog audio information to digital audio information and vice versa. An example of the audio information processor 7 is shown in detail in a block diagram in FIG. 2. Referring to the figure, the audio information processor 7 comprises a conventional microphone to serve as an audio input device 10, an amplifier circuit 11 for amplifying the audio signal inputted through the audio input device 10, a filter circuit (low-pass filter) 12 for eliminating high frequency components from the amplified signal, an analog-to-digital (A/D) converter 13 for digitizing the signal passed through the filter 12, a signal processing unit 14 designated to perform information amount reduction processing (hereinafter also referred to as compression processing) of the digitized signal as well as data restoration processing (hereinafter also referred to as expansion processing) of the information which has undergone compression processing, a digital-to-analog (D/A) converter 16 for restoring the original analog signal from the signal (digital signal) which has undergone expansion processing, a filter circuit (low-pass filter) 17 for eliminating high frequency components from the restored signal, a power amplifier 18 for amplifying the signal outputted from the filter circuit 17, an audio output device 19 such as, for example, a loud speaker for generating sound information from the amplified signal, a regulating circuit 20 for controlling the input sound volume (hereinafter referred to as input sound pressure), a regulating circuit 21 for regulating or controlling the output sound pressure, and a control interface (I/F) unit 15 for controlling signal transfer (also referred to as interface function) with the control unit 3 which controls the document editing system as a whole and controls the signal processor 14 in accordance with signals inputted from the control unit 3.

As can be seen in FIG. 1, the document editing system is further provided with a transmission processing unit 8, which is shown in more detail in a block diagram in FIG. 3. Referring to FIG. 3, the transmission processing unit 8 comprises a modem 30 for modulating the digital signal to a signal (analog signal) to be transmitted to a general telephone line or demodulating the analog signal inputted from the general telephone line to produce a digital signal, a hybrid circuit 31 for amplifying and filtering the input and output signals, respectively, of the modem 30, and a NCU (Network Control Unit) 32 for performing connection and disconnection to and from the general telephone line by means of a line connector 35, detection of incoming signals, generation of outgoing signal (dial signal), transfer of signals with a handset (conventional telephone receiver), outputting of a ringing tone signal to a ringer 34 (generally referred to as a calling bell) and others. Further, the transmission processor 8 includes a transmission control I/F (interface) unit 37 for as an interface for the control unit 3 of the document editing system as well as the control of the above-mentioned NCU 32 and an audio response unit 36 for responding to audio information generated by a human sender in an automatic terminating processing of the digital transmission.

Additionally incorporated in the document editing system is an image input unit 9 commonly referred to as an image scanner for inputting picture or image information, such as illustrations, photographs or the like, as is shown in FIG. 1.

Needless to say, the audio processor 7, the transmission processor 8 and the image scanner (picture input unit 9) mentioned above are placed under the control of the control unit 3 to operate in accordance with the contents of the programs stored in the memory unit 6.

Next, description will be made of a method of generating a digital signal through the compression processing of analog audio information by the above-mentioned audio processor 7 (this processing is referred to as ADPCM processing, an abbreviation of Adaptive Differential Pulse Code Modulation processing) by reference to FIG. 2 and FIGS. 4 to 6. The signal "Sigl" (FIG. 4) inputted through the audio input device 10 and passed through the amplifier circuit 11 and the filter circuit 12 is subjected to analog-to-digital conversion by the A/D converter 13. More specifically, the analog audio signal "Sigl" is sampled at a minute time interval which can be determined on the basis of a quantitization unit (a minute voltage corresponding to one bit), whereupon the voltage value representing the sampled sound level is converted to a digital signal (e.g. of eight bits at maximum). Through this processing, the digitized signals are sequentially supplied to the signal processor 14 to undergo information compression processing therein, whereby a difference value dni ($i = 1, 2, \ldots$) between the preceding input (supplied) signal and the current signal is determined. The difference value data "dni" again undergoes data processing in which the quantitizing unit is varied so that information, for example, of four bits can always be obtained (this schema is referred to as ADPCM). In other words, the amount of the compressed information is maintained constant by making correspondingly greater the quantitizing unit when the difference value "dni" is large, while reducing correspondingly the quantitizing unit when the difference value "dni" is small. Parenthetically, the circuit designed for performing the processing mentioned above (the circuit represented by a block 22 in FIG. 2) is commercially available under a trade name of "MSM6258 integrated circuit" from Oki Denki Kogyo, Inc. of Japan.

Figure 7:
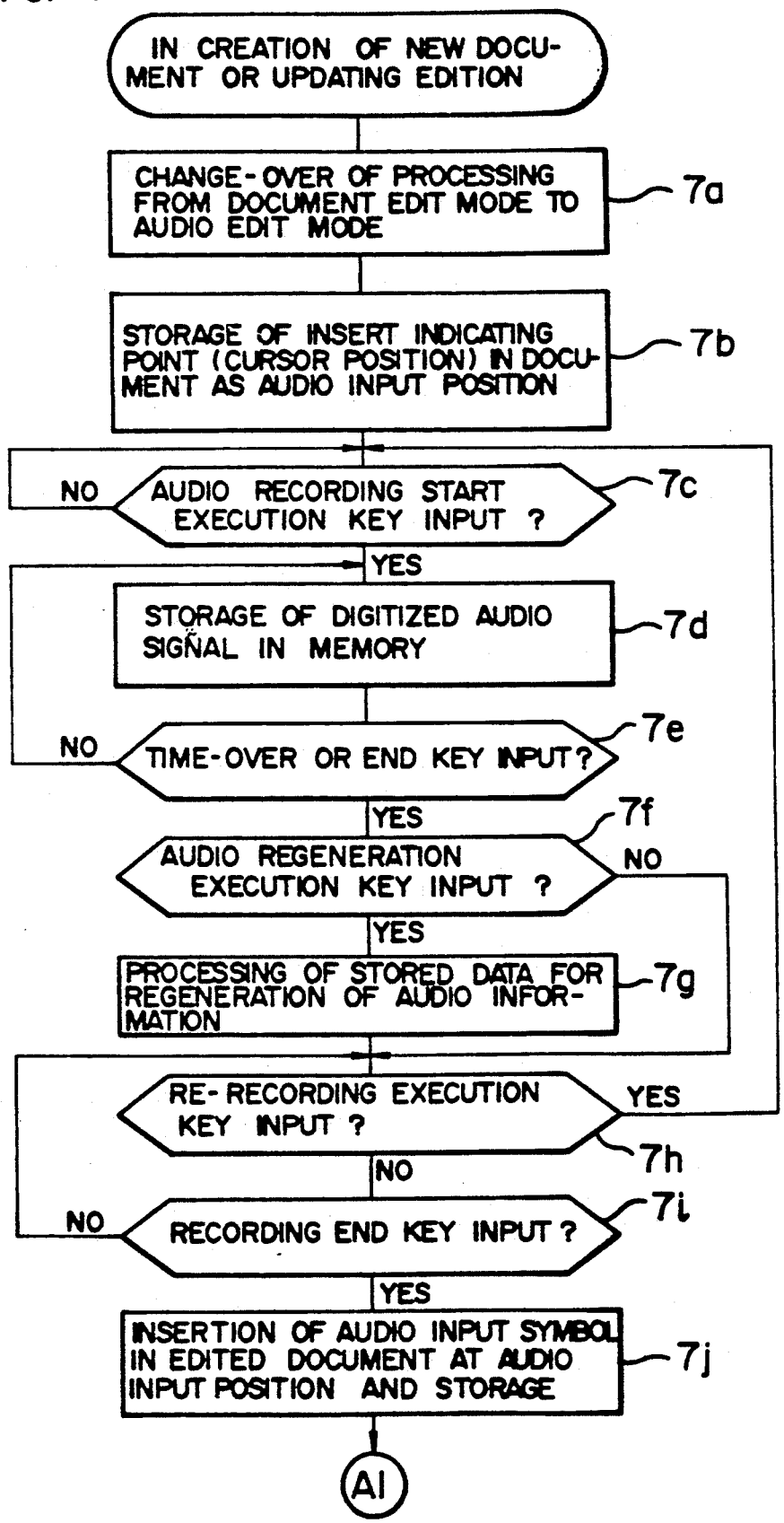
FIGS. 7 to 8 are flowcharts for a main processing to incorporate audio information into a document data.
Figure 8:
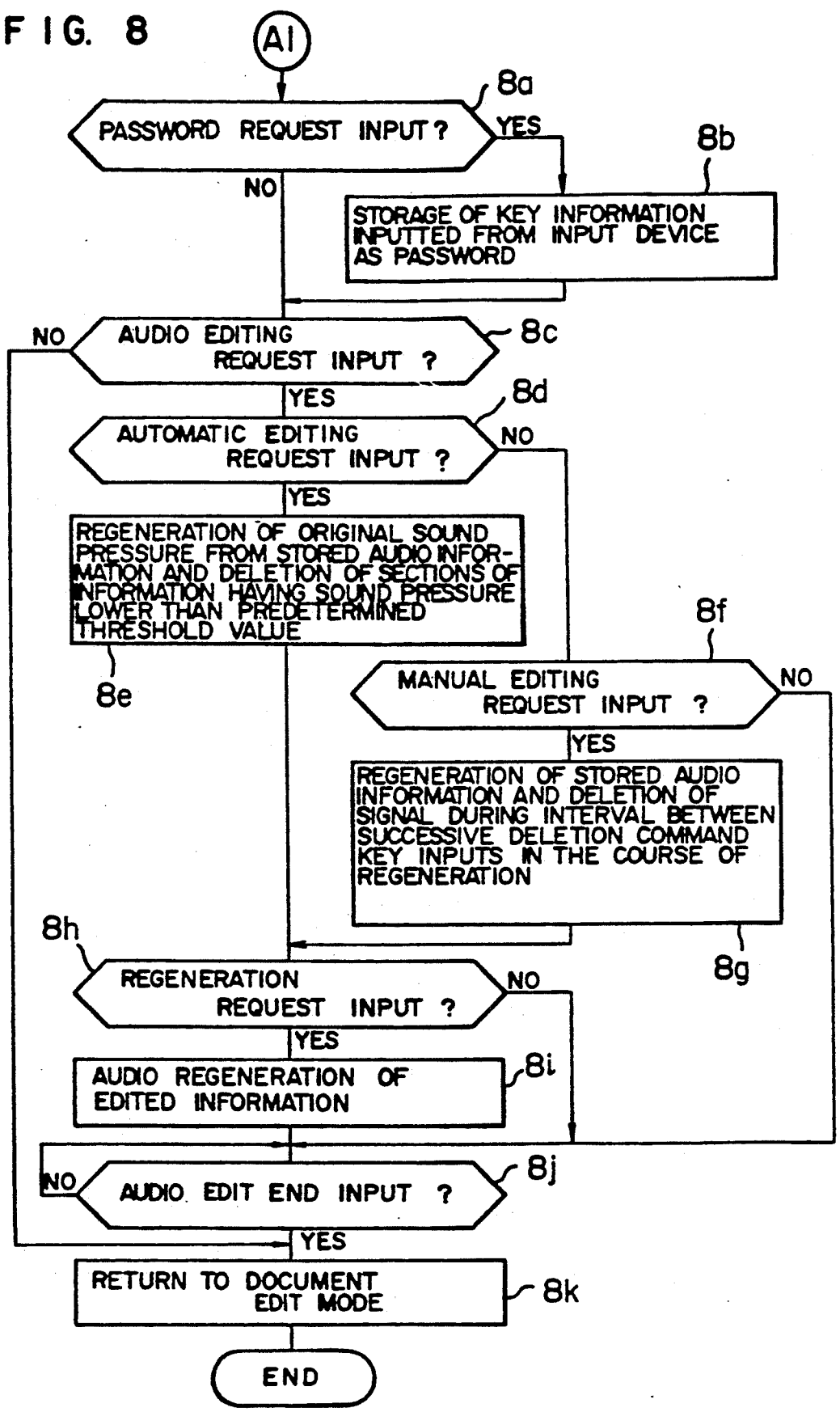

Next, referring to FIGS. 7 and 8, description will be made of the processing for adding audio information to a document. When audio information is to be inputted and added to a document in the course of creating a document or in the course of document updating for a document read out from the external storage equipment 5, an audio input mode is designated with the aid of the input device 2, whereupon an audio information editing mode of the document editing system is validated (step 7a). Then, at a step 7b, the position or location where the audio information is to be inserted is acquired and stored with the aid of a cursor which indicates on the display screen 1 a text or document input position and a location where editing is currently being performed. Subsequently, activation of an audio recording start key input is waited for (step 7c). Upon validation of this key input, information from the audio processor is stored in the memory unit 6 (step 7d). When the audio information input duration exceeds a predetermined time or alternatively a recording end key is actuated or inputted (step 7e), the audio information stored in the memory 6 can undergo an audio information regeneration processing performed by the audio processor 7 in response to the key input commanding the execution of regeneration of the audio information (step 7g). Thus, an operator can make a decision on the basis of the quality of regeneration as to whether or not the audio information regenerated is to be again recorded. Subsequently, when the key input commanding the execution of the re-recording is issued (step 7h), the routine starting from the step 7c inclusive thereof is again executed. In response to a key input commanding the end of the acoustic information recording (step 7i), the document or text information corresponding to the position indicated by the cursor on the display device 1 has added thereto a symbol representing the insertion of the audio information, which is then stored in the memory unit 6 (step 7j). At that time point, a decision is also made as to whether a password is to be affixed to the inserted acoustic information (step 8a). When a password is to be added, a password inputted through the input device 2 is stored in the memory unit 6 as the attribute information of the audio information stored in that memory unit 6 (step 8b). When the input audio information is to be edited (i.e. when editing of the audio information is to be performed by deletion of undesired audio information or the like processing), a decision is then made as to whether or not a request for automatic editing of the audio information is commanded through the input device 2 (step 8b) in response to the input of the audio information edit request from the input device 2. With the phrase "automatic editing of the audio information", it is intended to refer to the automatic deletion of acoustic information making an appearance during an interval in which the sound pressure as recorded and stored lies lower than a predetermined threshold level (step 8e). In the case of an edit process which is not performed automatically, the signal making an appearance during an interval for the deletion mentioned above can be deleted by inputting the delete function from the input device 2 while reproducing the recorded audio information (step 8g). The audio information editing procedure of this type is executed while reserving the initial input audio information in the storage, and the deletion mentioned above is finally performed at the time of registration (step 8k). Thus, the regeneration of the audio information which has undergone audio editing can be executed in response to a regeneration command inputted through the input device 2 (step 8i). At a step 8j, it is decided on the basis of the input whether or not the audio information is ended. Upon completion of editing of all the audio information, a document name is inputted to thereby allow the edited information to be registered and stored in the external storage equipment 5, as is generally the practice in the conventional word processors. In this way, it is possible to insert additionally the audio information in an ordinary document.

Figure 9:
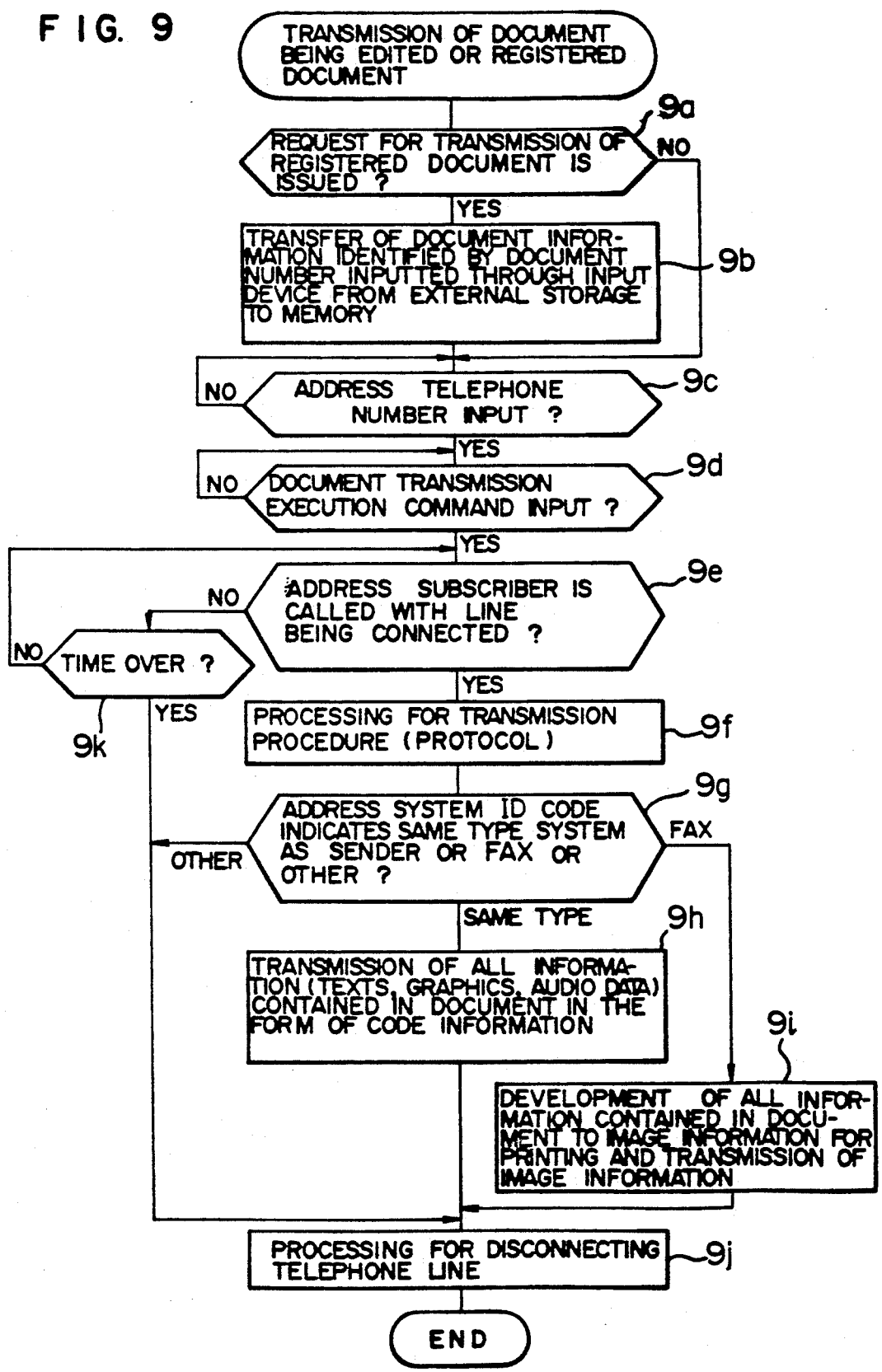
FIG. 9 is a flowchart for a transmission processing of document data containing audio information.

Now, description will turn to the processing for enabling transmission of the document information having additional audio information inserted therein, by reference to FIG. 9. In the case of a registered document (step 9a), a registered document identifier number is inputted to recall the document (step 9b). Subsequently, when a telephone number of the addressee subscriber is inputted (step 9c) with a command for execution of the transmission being also inputted through the input device 2 (step 9d), the transmission processor 8 calls the destination (i.e. the addressee subscriber) (step 9e), whereon the procedure for transmission (communication procedure protocol) is executed upon completion of the line connection procedure (step 9f). On the basis of the system species (type) identification information involved in this transmission procedure, it is decided whether the addressee (destination) is of the same type system or image transmission means generally referred to as facsimile equipment (simply termed FAX) at a step 9g. Although it is assumed, for convenience of explanation, that the addressee subscriber is either one of the same type system or facsimile device, it is rather common in practice that the addressee may be a human being or personal computer, making thus the decision more complicated. When the addressee or destination system is of the same species, all the information contained in the document information is transmitted in the form of the same code as that of the information stored in the external storage equipment 5 (step 9h0. In case the addressee is a facsimile system, all the information contained in the document information is developed to print image information which is then transmitted to the facsimile device (step 9i). Upon completion of the transmission in this manner, processing for disconnecting the transmission line is performed by the NCU 32 (step 9j). In the course of the transmission, information concerning signal error correction and for other purposes may also be transferred, although description thereof is omitted herein. The development of the audio information to the print image information carried out at the step 9i will be described in detail later on.

Figure 10:
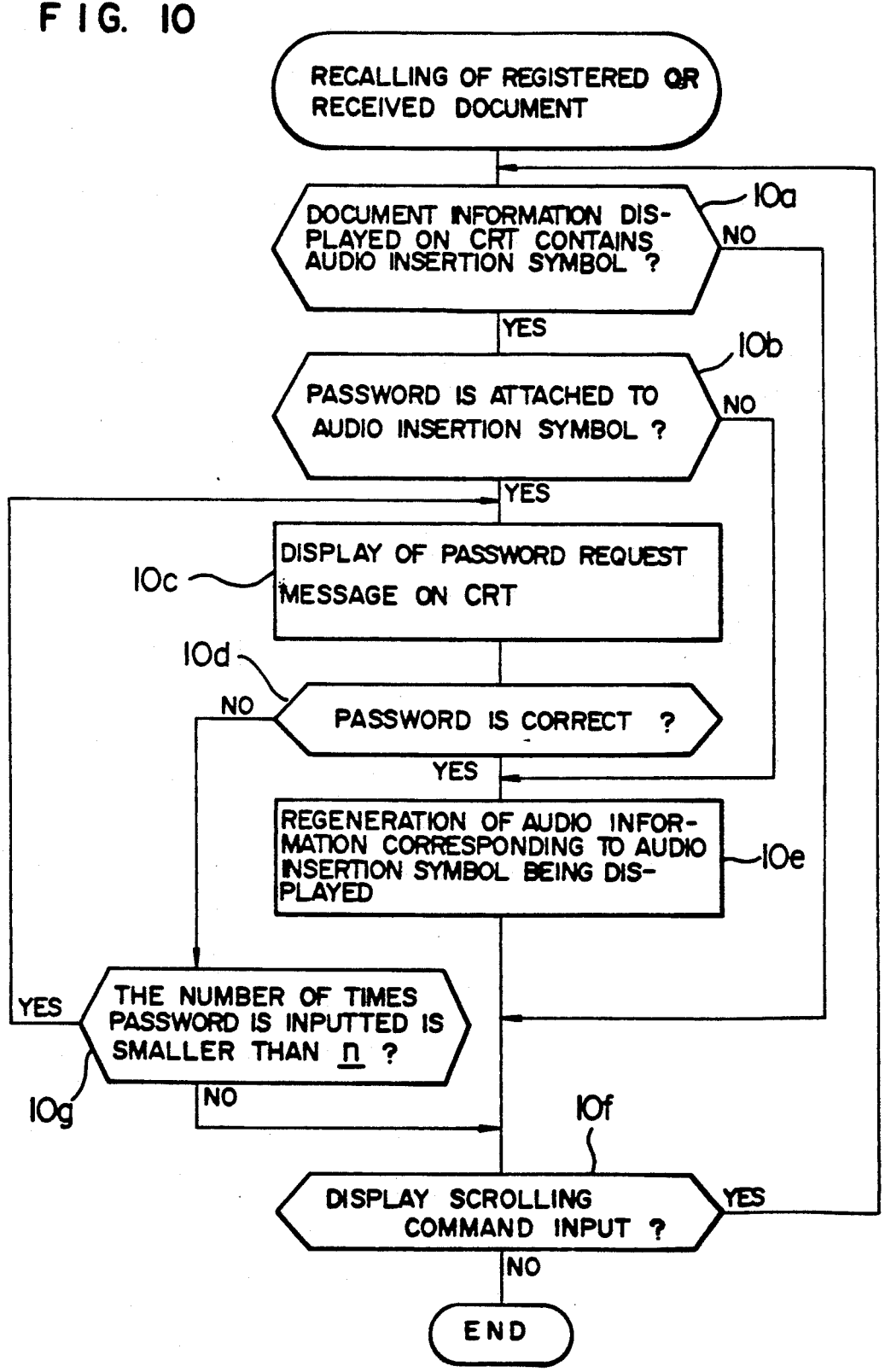
FIG. 10 is a flowchart for a recall processing of document data containing audio information.
Figure 11A:
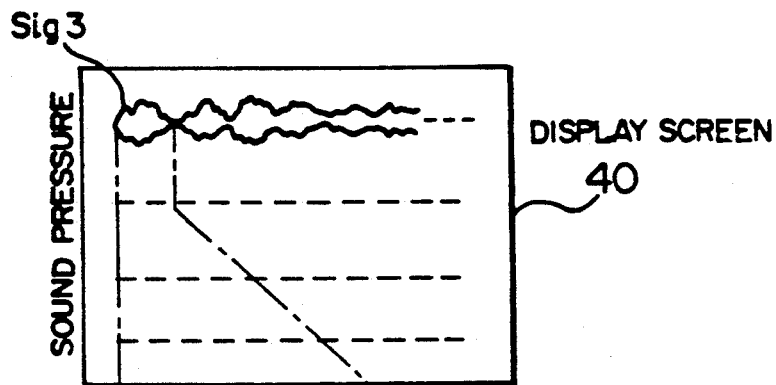
FIGS. 11A to 11C are diagrams showing display examples of a sound pressure display of audio information, respectively.
Figure 11B:
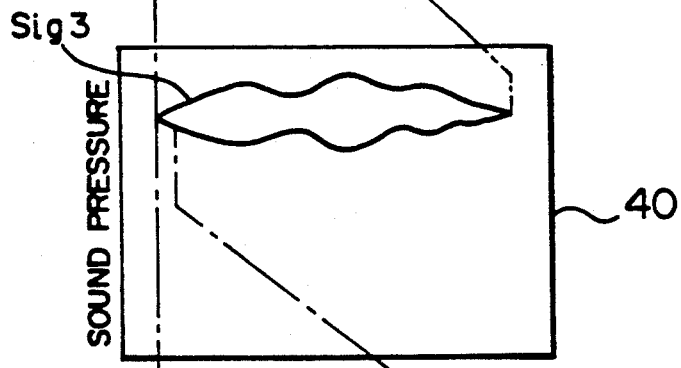
Figure 11C:
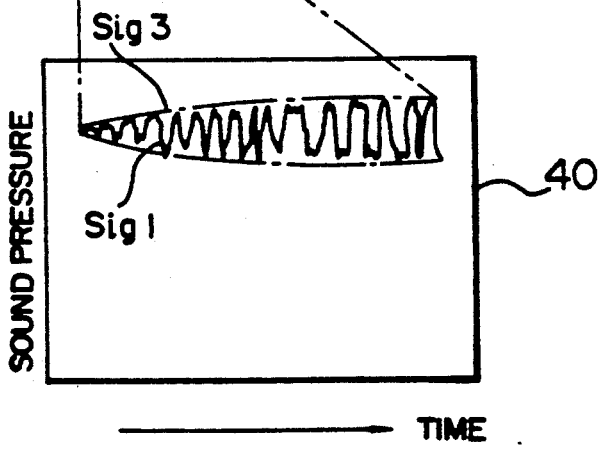

Now, referring to FIG. 10, description will be made of the processing performed for recalling a document registered or a document as transmitted. With the term "recall", it is intended to refer to the displaying of a document at a region destined for display on the screen of the display device. At first, it is decided whether the document which has been recalled contains the symbol indicating the insertion of audio information (step 10a). When the insertion symbol is found to exist, a decision is then made as to whether or not the audio information is accompanied by a password (step 10b). When the password is affixed, a password requesting prompt message is outputted onto the display device 1 (step 10c). Subsequently, a decision is made as to whether or not the password has been correctly inputted through the input device 2 (step 10d). When the answer of the decision step 10d is affirmative (YES), the audio information corresponding to the insertion symbol is processed to be regenerated by the audio information processor 7 (step 10e). Upon inputting of a false password, it is then decided whether or not the number of times the false password is inputted exceeds a predetermined number (n times) at step 10g. So long as the number n is not exceeded, the step 10c is retained, while, if otherwise, the audio information corresponding to the insertion symbol of concern is prevented from being regenerated. In this way, the audio information can be regenerated while ensuring confirmation with the display being scrolled on the display device 1 (step 10f).

Figure 12:
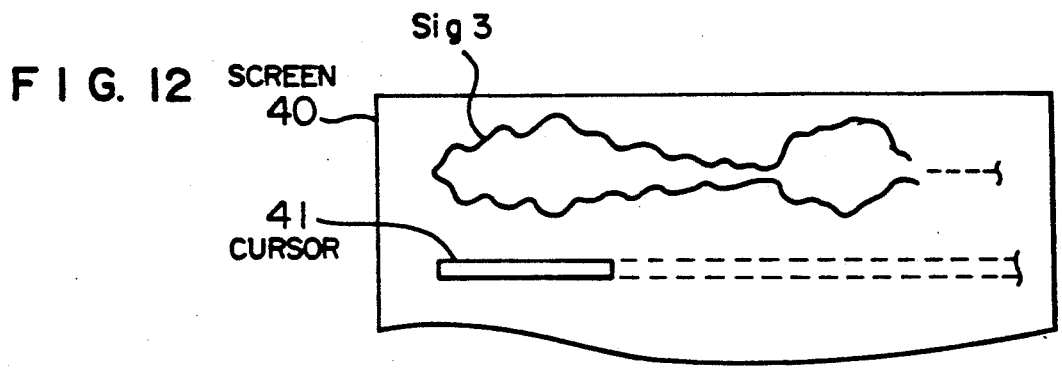
FIG. 12 is a diagram showing an example of a display of a cursor to indicate the reproducing position of a speech which is sound pressure displayed.
Figure 13A:
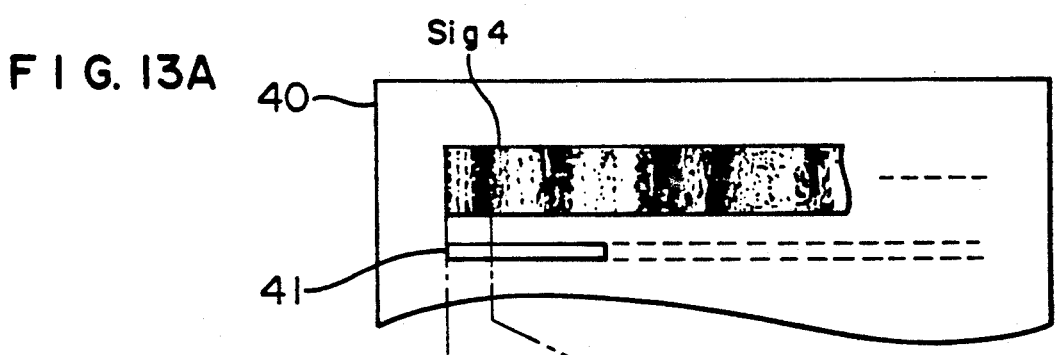
FIGS. 13A and 13B are diagrams showing examples in which audio information is displayed by a dot pattern system.
Figure 13B:
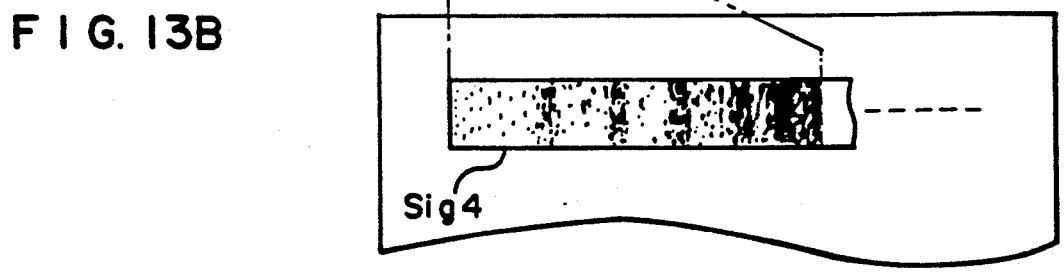
Figure 14:
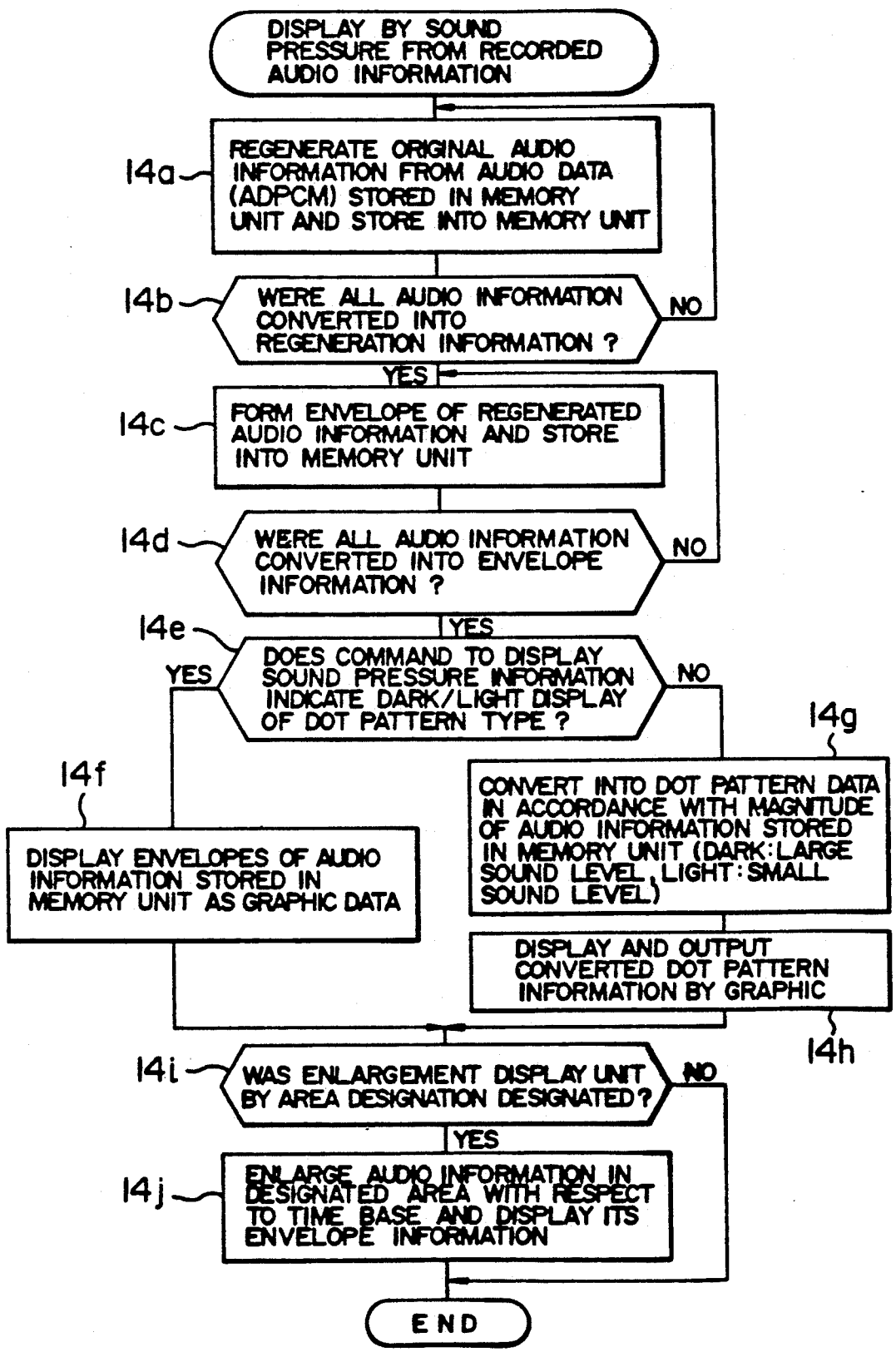
FIG. 14 is a flowchart for a processing to display audio information by the format of sound pressure information.
Figure 15:
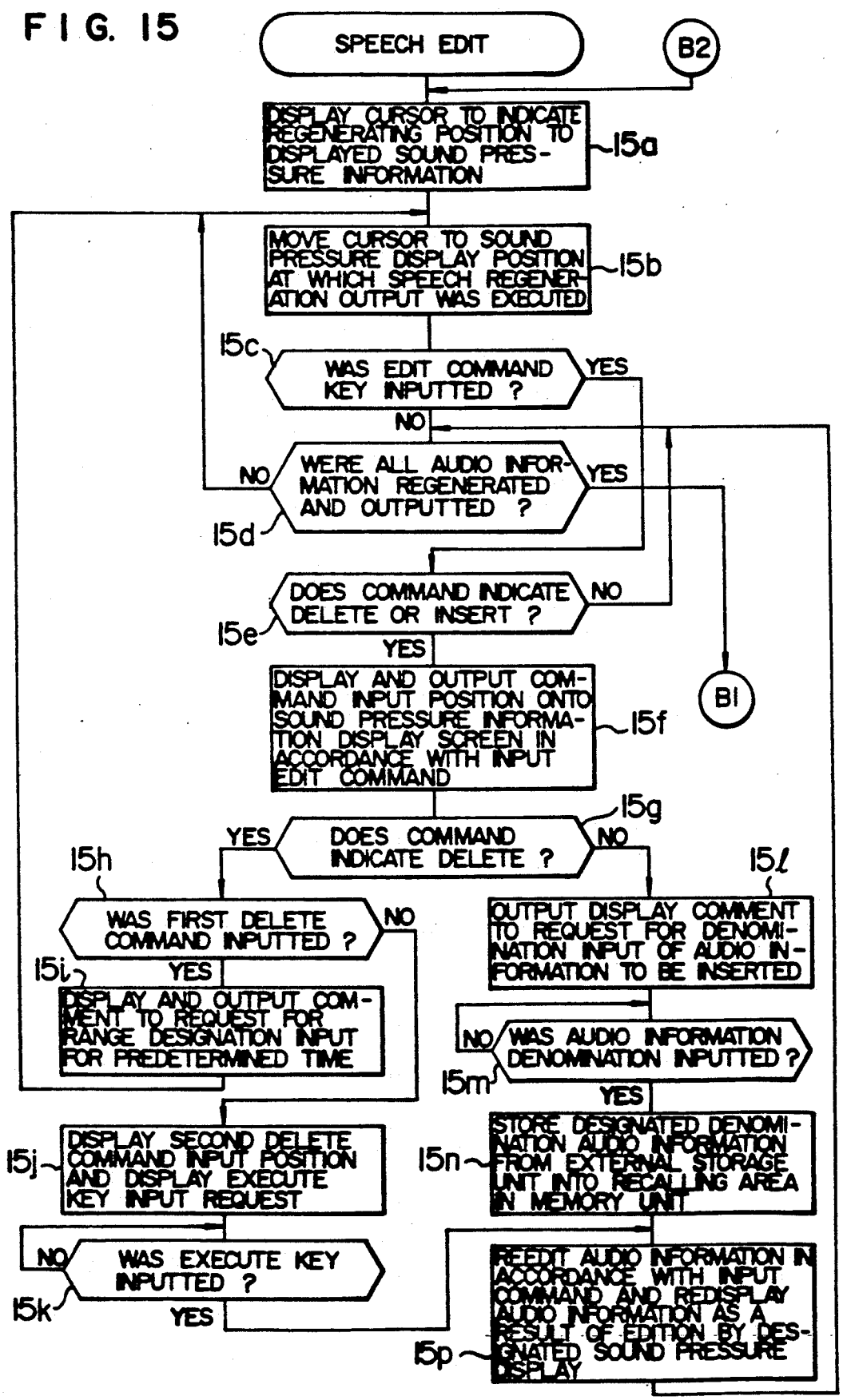
FIGS. 15 and 16 are flowcharts for an editing processing of audio information, respectively.

With reference to FIGS. 11 to 17, explanation will now be made of processings to display the audio information by the format of the sound pressure information and to make the manual editing of the input speech easy. First, from the audio information, that is, the ADPCM information stored in the memory unit 6, the original audio information Sigl is obtained by the control unit 3 from the sampling information (step 14a) as described in the processing of the speech processor 7 mentioned above. The reproduced audio information Sigl can be expressed by a format in which the sound frequency and the sound pressure information as a level of sound are contained together as shown in FIG. 11C. The sound pressure information as information of the sound level can be expressed by an envelope Sig3 of the reproduced sound. The envelope information Sig3 is calculated by the control unit 3 from the reproduced sound and stored into the memory unit 6 (step 14c). The resultant envelope information Sig3 is the sound pressure information to conveniently express the speech and is graphically displayed by the display device 1 (step 14f). The sound pressure information can be displayed by a display method based on the dot pattern type in which the portion of a large sound level is thickly expressed and the portion of a small sound level is thinly expressed or by a display method of the type in which the width of a strip-shaped pattern is changed and can be also displayed and outputted (Sig4 in FIGS. 13A and 13B) (step 14g and 14h). FIG. 13B shows an example in the case where a part of the display pattern of FIG. 13A is enlarged with respect to the time base. Further, FIG. 11A shows an example in the case where the sound pressure information is reduced with regard to the time base and displayed on a display screen 40. The displayed sound pressure information Sig3 also can be time base enlarged and displayed as shown in FIG. 11B by the range designation which was input from the input device 2 (step 14j). Processing flows for editing the speech will now be described with reference to FIGS. 15 to 17. As shown in FIG. 12, the sound pressure information Sig3 and a cursor 41 to indicate the position upon speech reproduction are displayed on the display screen 40 of the display device 1 (step 15a), so that the speech reproducing position can be easily confirmed by observing the display screen. That is, the cursor moves while displaying the position at which the speech is being reproduced (step 15b). with this, the audio information which has once been inputted can be listened to while confirming the reproducing position. When the "delete" or "insert" key as an edit command is inputted at the cursor display position (steps 15c and 15e), the command input position is displayed and outputted (step 15f). At this time, if the edit Command is "delete" (step 15g), a comment to request the designation of the range to delete upon first deletion input is displayed and output (step 15i). When the second delete command which denotes the range designation is inputted, the second input position is displayed (15j). The system waits until the "execute" key is inputted (step 15k). On the other hand, if the edit command indicates the "insert" key, a request to key input the denomination of the audio information to be inserted to the inserting position is displayed and outputted (step 15l). A check is then made to see if the audio information of the denomination which was inputted exists in the external storage unit 5 or not (step 15m). If it exists, the audio information of the input denomination which was read out of the external storage unit 5 is stored into a recalling information area in the memory unit 6 (step 15n). The new which the audio information was subjected to the "delete" or "insert" processing in accordance with the command is again displayed by the sound pressure display by the designation display method which has been described in the processing flow of FIG. 14 (step 15p). After completion of the reproduction of the speech to be edited, if an "end of editing" key has been inputted (step 16a), a comment to request to input the denomination of the new audio information whose editing was finished is displayed and outputted (step 16b). After the denomination was inputted (step 16c), the input denomination label is added to the audio information and the resultant audio information is registered into the external storage unit 5 (step 16d).

Figure 16:
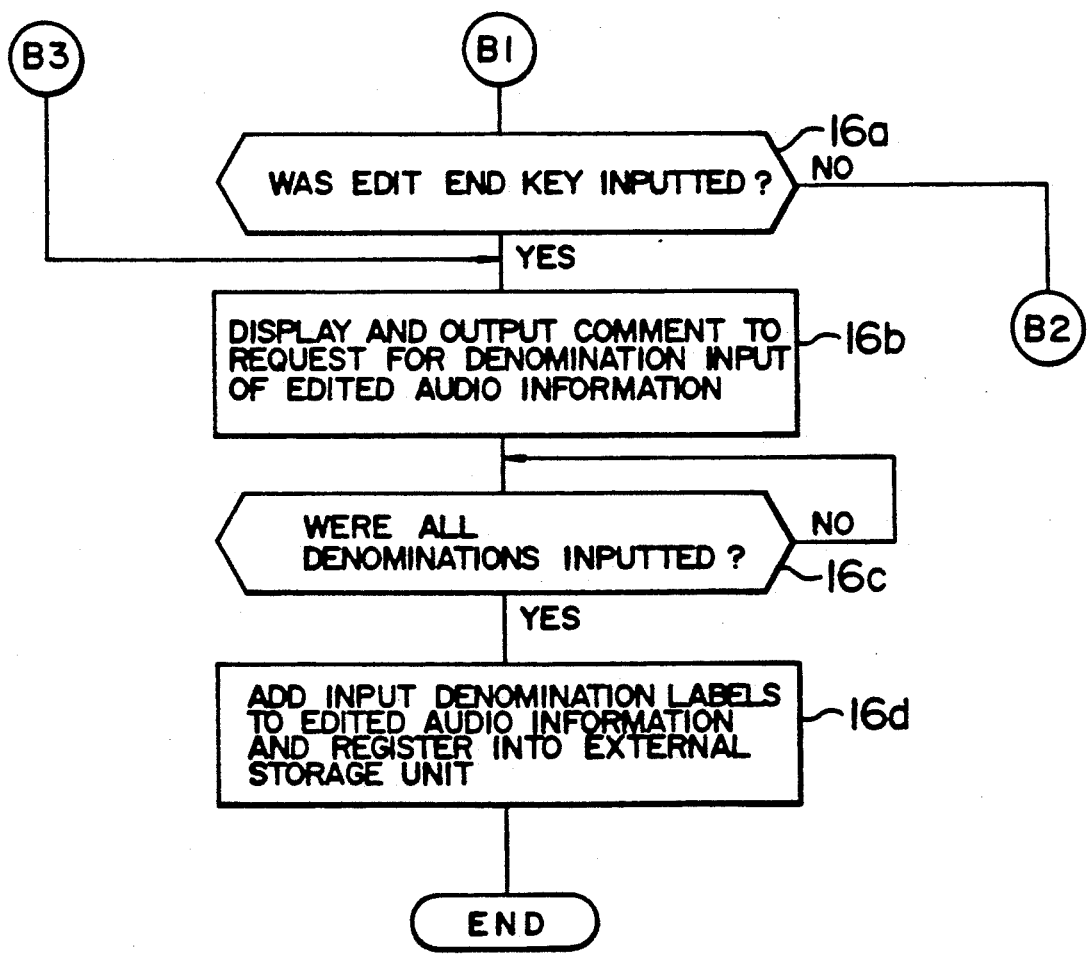
Figure 17:
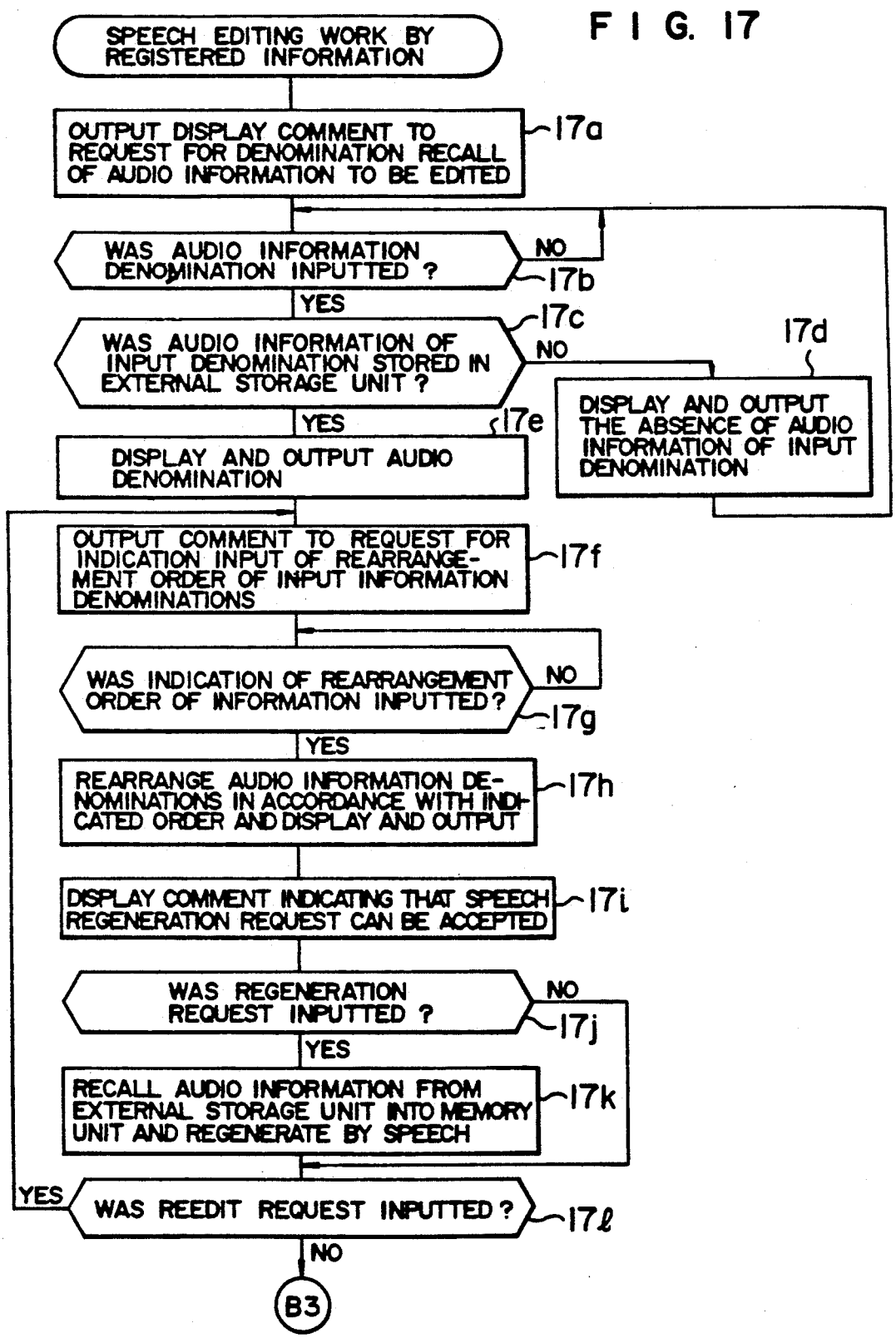
FIG. 17 is a flowchart for editing registered audio information by registration denominations.

A method of editing by only the denominations of the audio information which have already been registered will now be described with reference to FIGS. 16 and 17. First, a request to recall the denomination of the audio information to be edited is displayed on the screen (step 17a). After the denomination is inputted, a check is made to see if the input denomination information is the audio information or not on the basis of the recording information discrimination information (information to discriminate document/illustration/table data, etc. and speeches were added to such information) (step 17c). If the input denomination information is not the audio information, a display to inform such a fact is outputted (step 17d). If all of the input denomination information is audio information, the audio information is displayed in accordance with the input order (step 17e). A comment to request to rearrange those denominations is displayed (step 17f). When a command to rearrange is inputted, the audio information is displayed and outputted in accordance with the order of the rearranged denominations in accordance with the input order (step 17h). A comment to accept the speech reproduction request based on he rearranged order is displayed (step 17i). If the reproduction request is inputted, the audio information stored in the external storage unit is recalled to the memory unit 6 in accordance with the instructed order and they are continuously reproduced by the speech (step 17k). If a reediting is requested, the editing can be executed from step 17f. If a reediting is not requested, the system is set into the mode to output a request to input the denominations onto the display screen in step 16b.

According to the invention, by displaying the input audio information by the sound pressure information and by displaying the reproduction information position upon reproduction, the correlation of the speech content and the sound pressure information can be easily discriminated. Thus, editing such as extraction of only the necessary audio information or the like can be executed as if a text document being edited. On the other hand, the audio information which was divisionally inputted and registered can be coupled or rearranged by using the denominations of the information registered.

What is claimed is:

1. A system for editing data, comprising:
   inputting means for inputting analog audio information;
   converting means for converting the analog audio information into digital audio information;
   storing means for storing the digital audio information;
   generating means for generating information representing sound pressure of the stored digital audio information from the stored digital audio information;
   displaying means for displaying a cursor and the generated sound pressure information in accordance with a designated time scale which is designated in accordance with an input time command, such that a designated portion of the sound pressure information is expanded with respect to time; and
   reproducing means, responsive to an input edit command, for reproducing audio information from the stored digital audio information and for representing a portion of the reproduced audio information corresponding to a position of the cursor for an edit operation on said displaying means along with information representing sound pressure of the displayed reproduced audio information portion.

2. A system according to claim 1, further comprises means for adding at least a portion of the stored digital audio information to another information.

3. A system according to claim 2, wherein said another information is document data.

4. A system according to claim 1, further comprising deleting means for deleting a portion of the stored digital audio information corresponding to a designated range of the displayed sound pressure information.

5. A system according to claim 1, further comprising inserting means for inserting other designated digital audio information into a portion of the stored digital audio information corresponding to a designated portion of the sound pressure information.

6. A system according to claim 1, wherein said displaying means includes means for displaying as the sound pressure information an envelope of sound pressure of the reproduced audio information being displayed.

7. A system according to claim 1, wherein said displaying means includes means for displaying as the sound pressure information sound pressure of the reproduced audio information portion by a density of displayed dots.

8. An editing system having an external storage unit comprising:
   storing means for storing a plurality of digital audio information records in the external storage unit;
   assigning means for respectively assigning names to the plurality of stored digital audio information records;
   displaying means for displaying designated names corresponding to the names assigned to the plurality of stored digital audio information records;
   editing means for rearranging the designated names to an order designated by an input edit command; and
   reproducing means for reproducing audio information from the digital audio information records corresponding to the designated names in accordance with the order designated by the input edit command and representing information of sound pressure of the reproduced audio information on the displaying means along with the designated names.

9. A method of editing data comprising the steps of:
   storing a plurality of digital audio information with names in a storage unit;
   displaying information representing sound pressure of a specific one of the plurality of stored audio information in response to designation of a specific name;
   editing, while reproducing the specific audio information, the specific audio information in accordance with the sound pressure information and a reproduced audio information portion;

storing the edited audio information with a new name in the storage unit; and adding one of the plurality of stored audio information to other information.

10. A method according to claim 9, further comprising the steps of:

arranging designated names to sequentially link a plurality of audio information stored in the storage unit to one another in accordance with a designated order of the designated names; and storing the plurality of linked audio information.

* * * * *